Feb. 5, 1963 D. H. DENNIS 3,076,566
WAREHOUSING SYSTEM
Filed June 18, 1959 6 Sheets-Sheet 1

Fig.1

INVENTOR
DAVID H. DENNIS
BY
AGENT

Fig. 3

Feb. 5, 1963  D. H. DENNIS  3,076,566
WAREHOUSING SYSTEM
Filed June 18, 1959  6 Sheets-Sheet 4

INVENTOR
DAVID H. DENNIS
BY
Gerald Dunstewitz
AGENT

Feb. 5, 1963   D. H. DENNIS   3,076,566
WAREHOUSING SYSTEM
Filed June 18, 1959   6 Sheets-Sheet 5

INVENTOR
DAVID H. DENNIS

Fig.11

United States Patent Office 3,076,566
Patented Feb. 5, 1963

3,076,566
WAREHOUSING SYSTEM
David H. Dennis, Short Hills, N.J., assignor to Specialties Development Corporation, Belleville, N.J., a corporation of New Jersey
Filed June 18, 1959, Ser. No. 821,274
5 Claims. (Cl. 214—16.4)

The present invention relates to article handling systems, and, more particularly, to automatic warehousing systems in which articles are removed from a place of storage and are delivered to a point of collection.

The picking, collection and sorting of a large number of orders calling for only a small number of items of the same kind has become a serious problem with the present high cost of labor. For example, in dress pattern warehousing, there has long been a need for an automated system for picking and handling stock because of such conditions.

The dress pattern business is peculiar in that the retailer, at the end of each business day, orders replacements for those patterns sold during that day, and in most cases the retailer will not sell more than one pattern of a particular style and size during any one day. The dress pattern warehouses, therefore, receive many orders each day and most of these orders call for only one of each of the patterns listed thereon. Filling these orders manually requires a great deal of time since the person filling the order must generally go to as many stock locations as there are items listed on the order, and frequently must travel from one end of the warehouse to the other to fill an order calling for only a few patterns.

Another problem in dress pattern warehousing arises from the fact that the patterns must be arranged in sequence according to their identifying number so that a person filling an order can locate the patterns quickly. When a pattern of a particular style is discontinued, these patterns are removed from their storage location and their identifying number is placed on a list of discontinued styles so that retailers subsequently ordering this pattern will be notified that the style is no longer available. When new styles are added to the line, they are assigned to the next number to that of the highest numbered article in the warehouse. The number of storage locations in any warehouse are limited, therefore, in order to maintain a numerical sequence it is necessary to periodically move all of the patterns in the warehouse to fill the vacant locations and make room for new styles.

Accordingly, an object of the present invention is to provide a warehousing system for rapidly and selectively removing a number of diverse articles from a storage unit.

Another object is to provide a warehousing system for removing diverse articles from a storage unit and sorting the articles to fill a plurality of orders simultaneously.

Another object is to provide a warehousing system for selectively removing from a storage unit diverse articles randomly located in the storage unit.

Another object is to provide a warehousing system in which articles are picked, collected and sorted automatically.

A further object is to provide a stock picking and handling machine for filling a plurality of orders more rapidly at less labor cost.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein.

*General Description*

Figure 1:
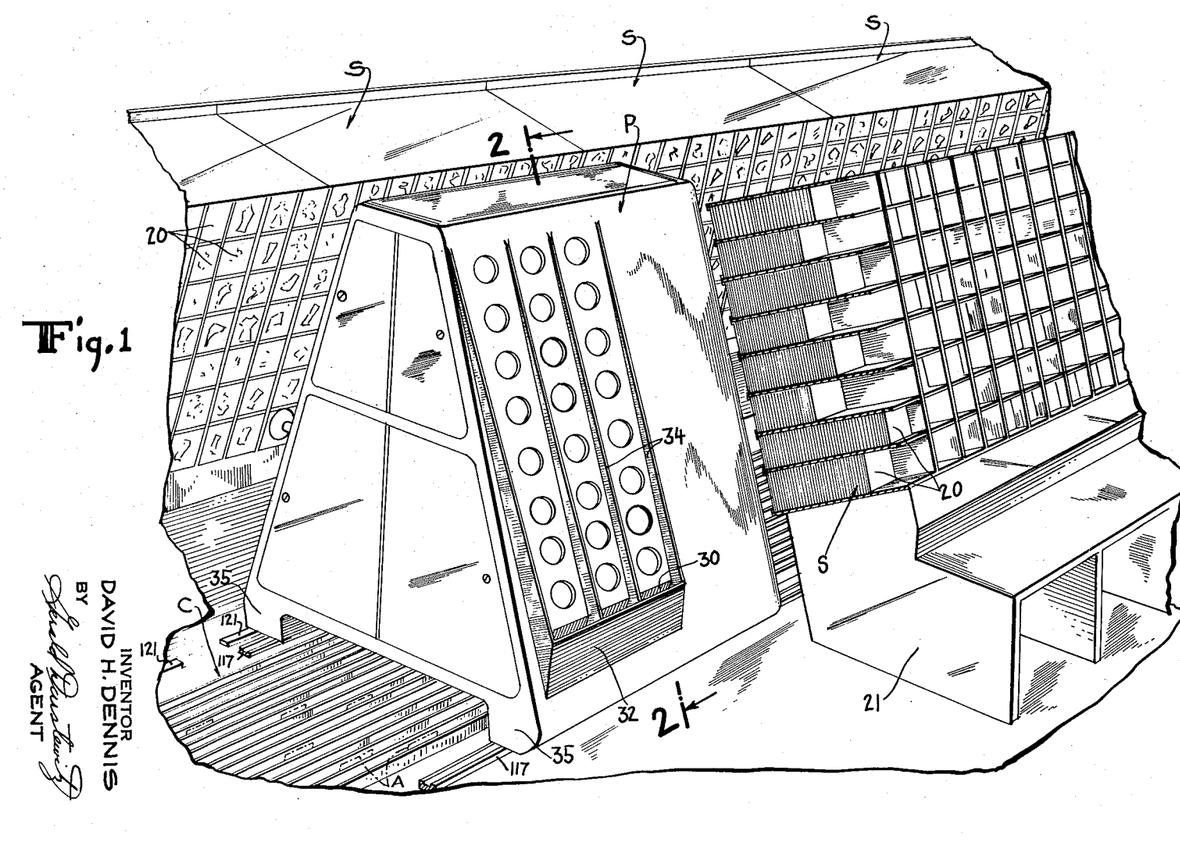
FIG. 1 is a perspective view showing the general layout of a warehouse and a picking machine in accordance with the present invention.

Referring to the drawings in detail and particularly to FIG. 1 thereof, a warehousing system is shown which generally comprises two lengthwise extending, spaced, parallel rows of stock storage units S, a stock picking machine P positioned between the storage units and movable longitudinally adjacent both rows of the units, and a conveyor C positioned between the storage units and beneath the picking machine.

Figure 2:
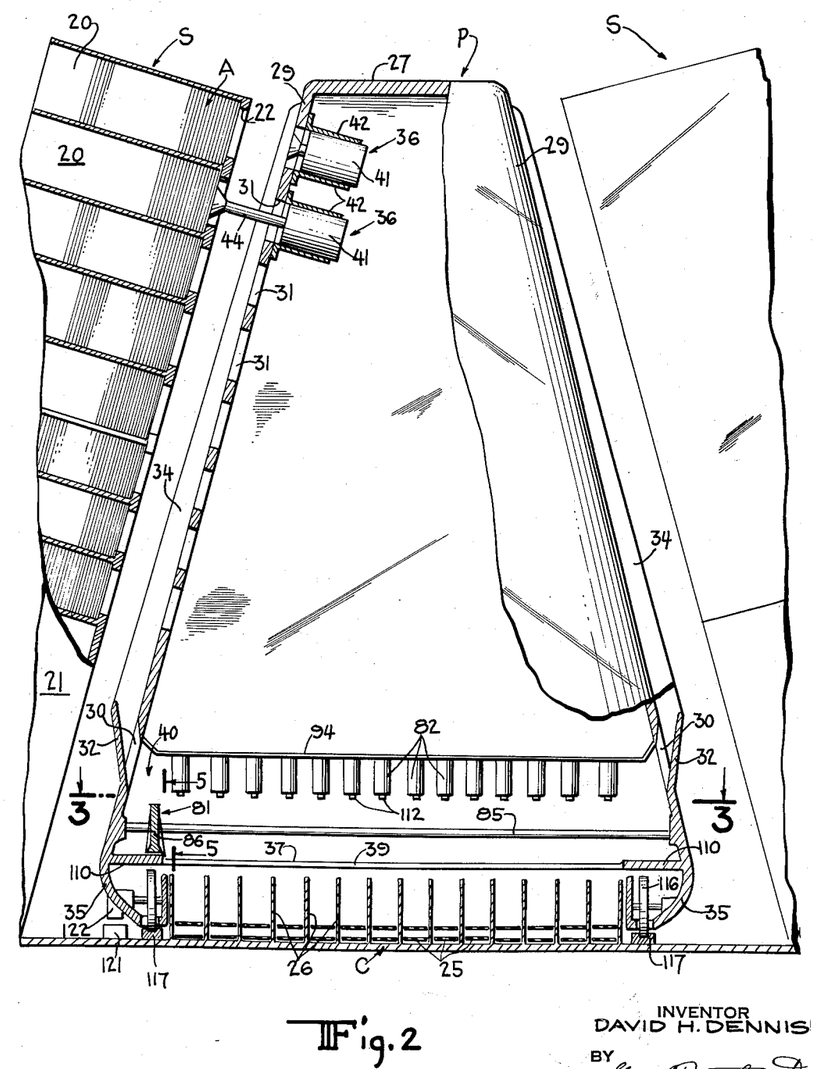
FIG. 2 is a sectional view taken along the line 2—2 on FIG. 1 showing in greater detail the arrangement of the machine illustrated in FIG. 1.

Each of the storage units, as shown in FIGS. 1 and 2, includes a plurality of storage bins 20 arranged in a series of vertical columns eight bins high which are aligned in a row and elevated from the floor by a platform 21. The bins each have a rectangular cross-section, are open at each end, and are inclined downwardly toward the picking machine. The open end of each bin adjacent the picking machine is provided with lips 22 to retain the stock, for example dress patterns A, in the bins. To insure that the patterns will be fed by gravity to the lower end of the bin as the stock is depleted, the bins may be inclined at an angle sufficient to provide this action or a weight may be placed behind the patterns.

The conveyer comprises a plurality of conveyor belts 25, fourteen being shown, which are driven by a common motor (not shown). The strands of the belts 25 are each positioned between a pair of stationary vertical walls 26 which extend above the belts to provide lateral support for patterns placed edgewise on the upper strand.

The picking machine includes a cabinet 27 having a pair of inclined walls 29 facing the lower openings of the bins in each of the storage units. Each of the inclined walls 29 includes a portion which is provided with a horizontally extending elongated opening 30 near the bottom thereof and a plurality of circular openings 31 arranged above the opening 30 in three vertical columns of eight openings each. A deflecting chute 32 extends upwardly from the bottom edge of the opening 30, and guiding walls 34 extend from the chute 32 upwardly on either side of each column of openings. The cabinet 27 is also provided with two leg portions 35 extending downwardly from the lower edge of the inclined walls 29 which straddle the conveyor.

Figure 3:
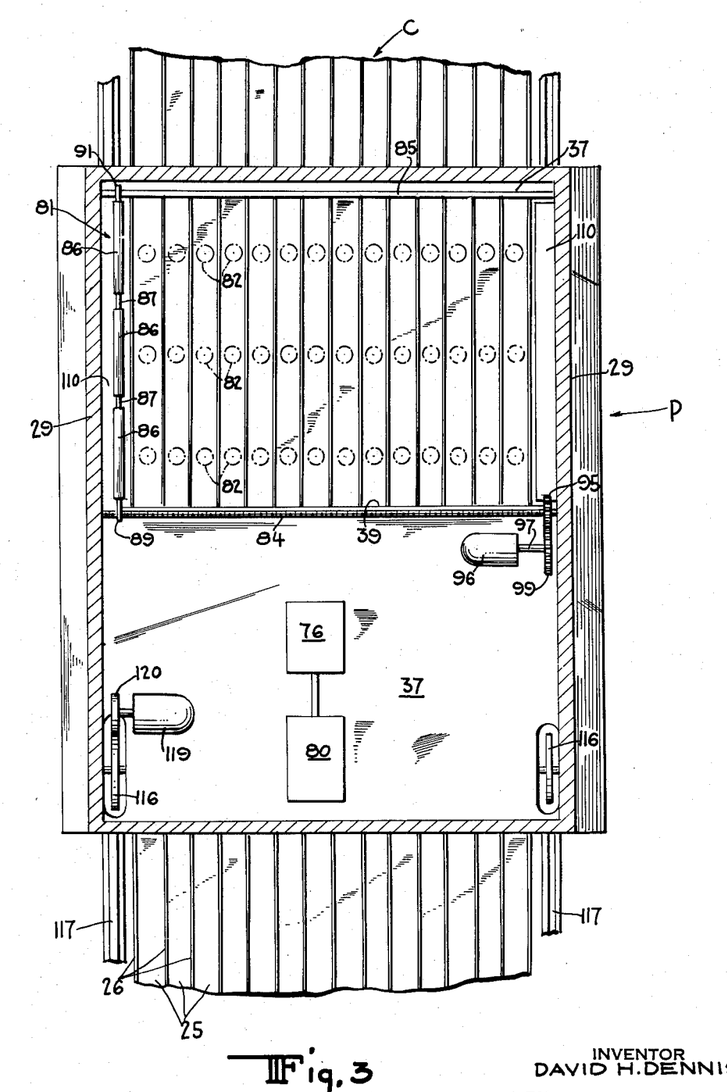
FIG. 3 is a sectional view taken along the line 3—3 on FIG. 2.

A vacuum picking unit 36 is positioned within the cabinet 27 at each of the openings 31, and, as shown in FIGS. 2 and 3, the cabinet is provided with a floor 37 having an opening 39 therein. The picking machine is also provided with a sorting mechanism 40 positioned within the cabinet adjacent the opening 39 for selectively placing patterns on the conveyor belts 25.

The Picking Mechanism

Each of the picking units 36 (as shown in FIG. 2) comprises a cylinder 41 attached to the inside face of the inclined wall 29 by brackets 42, and an article engaging piston 44 movably mounted in the cylinder 41 for extension outwardly through the opening 31. The cylinder 41, as shown in FIG. 4, includes a tubular wall 45 having a port 46 therein, an outer end wall 47 provided with an opening 48, an inner end wall 49 having a port 50 therein, and an annular flange 51 extending radially inwardly from the wall 45 between the port 46 and the inner end wall 49.

The piston 44 comprises a cylindrical body 52 extending outwardly through the opening 48 and inwardly past the flange 51, an annular flange 54 extending radially outwardly from the cylindrical portion 52 and positioned within the cylinder 41 between the end wall 47 and the flange 51, and a cup shaped formation 55 on the outer end of the cylinder portion 52. The piston 44 is provided with a bore 56 extending axially through the body 52 and the formation 55, and a rubber cup shaped head 57 having a centrally located opening 59 is attached to the outer surface of the formation 55. A coil spring 60 is positioned within the cylinder 41 between the cylinder flange 51 and the piston flange 54 to urge the piston 44 outwardly. The cross sectional area of the portion 52 (including the area of the bore 56) is greater than the area of the flange 51 and the flanges 51 and 54 are provided with suitable O rings to prevent leakage between the cylinder 41 and the piston 44.

Figure 4:
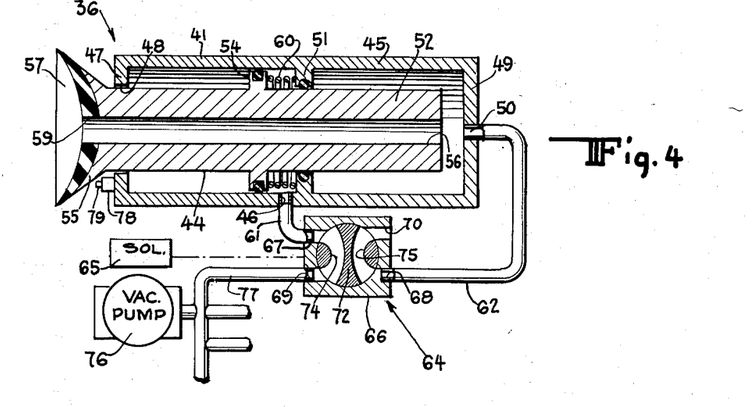
FIG. 4 is a longitudinal sectional view of one of the picking units schematically showing the operating devices which are connected thereto.

As schematically illustrated in FIG. 4 the port 46 in the wall 45 and the port 50 in the wall 49 are connected by conduits 61 and 62 respectively to a four way valve 64 which is under the control of a solenoid 65. The valve 64 includes a body 66 having ports 67, 68, 69 and 70, and a rotatable valve member 72 provided with arcuate passageways 74 and 75. The conduits 61 and 62 are connected respectively to the valve ports 67 and 68, and a vacuum pump 76 is connected to the port 69 by means of a conduit 77. The solenoid 65 is connected to the valve member 72 to cause the rotation thereof.

When the solenoid is de-energized, the valve 64 is in the condition shown with the passageways 74 and 75 connecting the ports 67 and 70 to the ports 69 and 68 respectively. When energized, the solenoid rotates the valve member 72 to a position where the passageway 74 connects the ports 67 and 70 and the passageway 75 connects the ports 69 and 68. A limit switch 78 having a plunger 79 is mounted on the outer face of the wall 47 in a manner such that the formation 55 will contact and depress the plunger 79 upon retraction of the piston as described hereinafter. The vacuum pump 76, as shown in FIG. 3, is mounted on the floor 37 of the cabinet 27 and is driven by a motor 80.

The Sorting Mechanism

Figure 5:
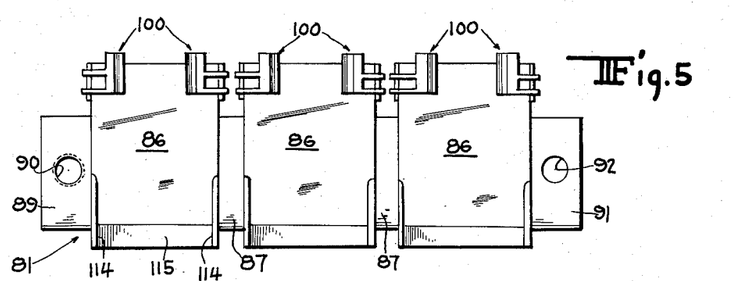
FIG. 5 is a detailed elevation of one of the components of the sorting mechanism shown in FIGS. 2 and 3.

The sorting mechanism 40 (FIGS. 2 and 3) includes an article traversing assembly 81 and a plurality of article releasing solenoids 82. The assembly 81 is supported above the opening 39 by a threaded rod 84 and a guide rod 85, and includes (FIG. 5) three pattern carrying plates 86 joined together by web sections 87 and provided with a support section 89 having a threaded bore 90 therein for engagement with the threaded rod 84, and a support section 91 having a smooth bore 92 therein for engagement with the guide rod 85. Each of the plates 86 is aligned with one of the columns of picking units 36, and the solenoids 82 are supported above the plates 86 by a frame 94 (FIG. 2) and are arranged in three rows (FIG. 3), each row being aligned with one of the plates 86 and each solenoid in the row being positioned over one of the conveyor belts 25. The threaded rod 84 is journaled in bearings (not shown) at each end thereof and has a gear 95 secured thereto. A reversible motor 96 is mounted on the floor 37 of the cabinet 27 and has a shaft 97 provided with a gear 99 for engaging the gear 95 to rotate the rod 84 and move the assembly 81 back and forth under the solenoids 82.

As shown in FIGS. 5 to 10, each of the plates 86 is provided with a pair of clips 100 on each side thereof for holding the patterns to the plate as the assembly 81 moves over the opening 39. Each of the clips 100 has an elongated vertical body section 101 provided with a curved portion 102 extending past the upper surface of the plate 86 and a pair of arms 104 extending from the body portion. The arms 104 are pivoted on a vertical pin 105 supported by a pair of mounting bars 106 extending from the edge of the plates 86 adjacent the top thereof.

Each of the plates 86 is provided with a pair of recesses 107 on each side thereof, and a spring 108 (FIG. 8) mounted on each of the pins 105 acts against the bars 106 and the clip arms 104 to rotate the clips toward the surface of the plate 86 and seat the clip curved portion 102 in one of the recesses 107. The clip arms 104 of each clip have a portion extending past the pin 105, and, when the traversing assembly 81 is positioned adjacent either of the walls 29 (FIG. 6) these portions of the arms 104 are engaged by a protrusion 109, which extends from the inclined wall 29, and the clips 100 are held away from the surface of the plate 86 against the action of the spring 108. A shelf 110 extends from each of the walls 29 to support the patterns while the traverse assembly 81 is in the position shown in FIG. 6.

Figure 7:
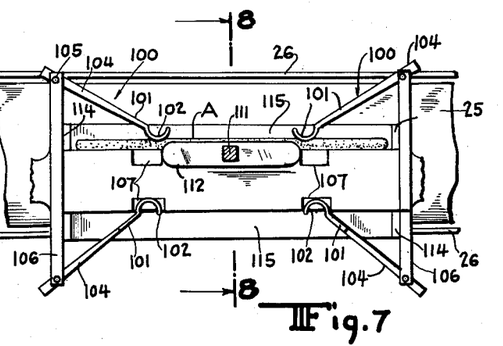
FIG. 7 is a plan view of a portion of the sorting mechanism illustrating its article releasing operation.
Figure 9:
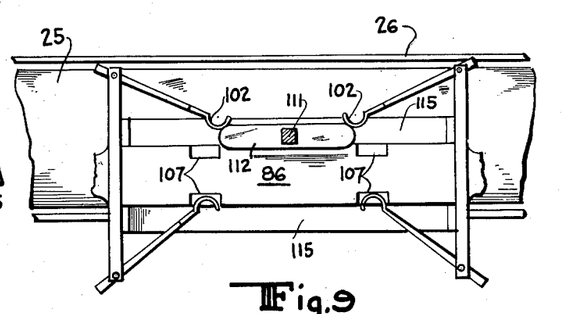
FIG. 9 is a plan view similar to FIG. 7 illustrating the article releasing operation in an advanced stage.
Figure 10:
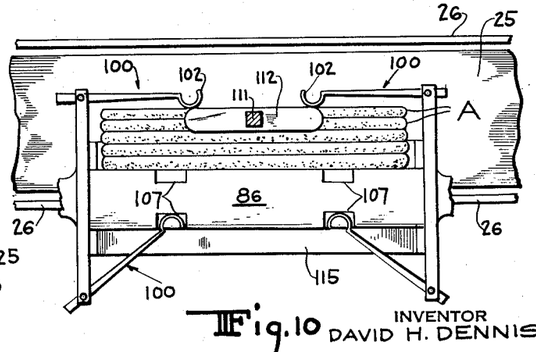
FIG. 10 is a plan view similar to FIGS. 7 and 9 illustrating the operation of the sorting mechanism when handling a plurality of articles.

Each of the solenoids 82 is provided with a plunger 111 (FIGS. 7 to 10) having a bar 112 mounted thereon for engagement with the protruding upper part of the curved portion 102 of those clips 100 mounted on the plate 86 aligned with the solenoid. The plunger 111 is spring loaded in its retracted position so that the bar 112 is normally positioned above the level of the clips and is moved downwardly to the positioned shown in FIG. 8 when the solenoid is energized. Each of the bars 112, as shown in FIGS. 7, 9 and 10, is aligned with the transverse center line of the respective plate 86 and extends from this centerline outwardly to the planes defining the inner edges of the recesses 107. Each of the bars 112 is therefore so positioned and dimensioned that when a plate 86 moves past an energized solenoid, the bar will engage the clip portions 102 only if the clips 100 are holding one or more patterns A against the face of the plate 86 and thereby the portions 102 are prevented from seating in the recesses 107.

Figure 8:
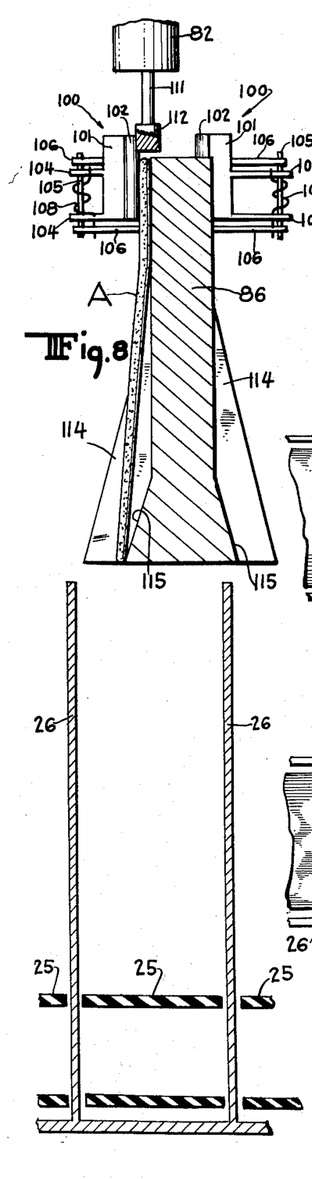
FIG. 8 is a sectional view taken along line 8—8 on FIG. 7.

The plates 86 are provided with guiding walls 114 and inclined surfaces 115 at the lower end to insure, as described hereinafter, that the patterns released by the energization of any given solenoid fall onto the proper conveyor belt 25 (FIG. 8).

The Picking Machine Positioning Mechanism

As previously mentioned, the picking machine is movable longitudinally between the storage units. For this purpose two wheels 116 (FIGS. 2 and 3) are provided in each of the leg sections 35 of the cabinet 27 for engagement with rails 117 positioned at each side of the conveyor. A motor 119 (FIG. 3) mounted on the floor 37 drives one of the wheels 116 through a friction wheel 120 to move the picking machine along the rails.

Figure 11:
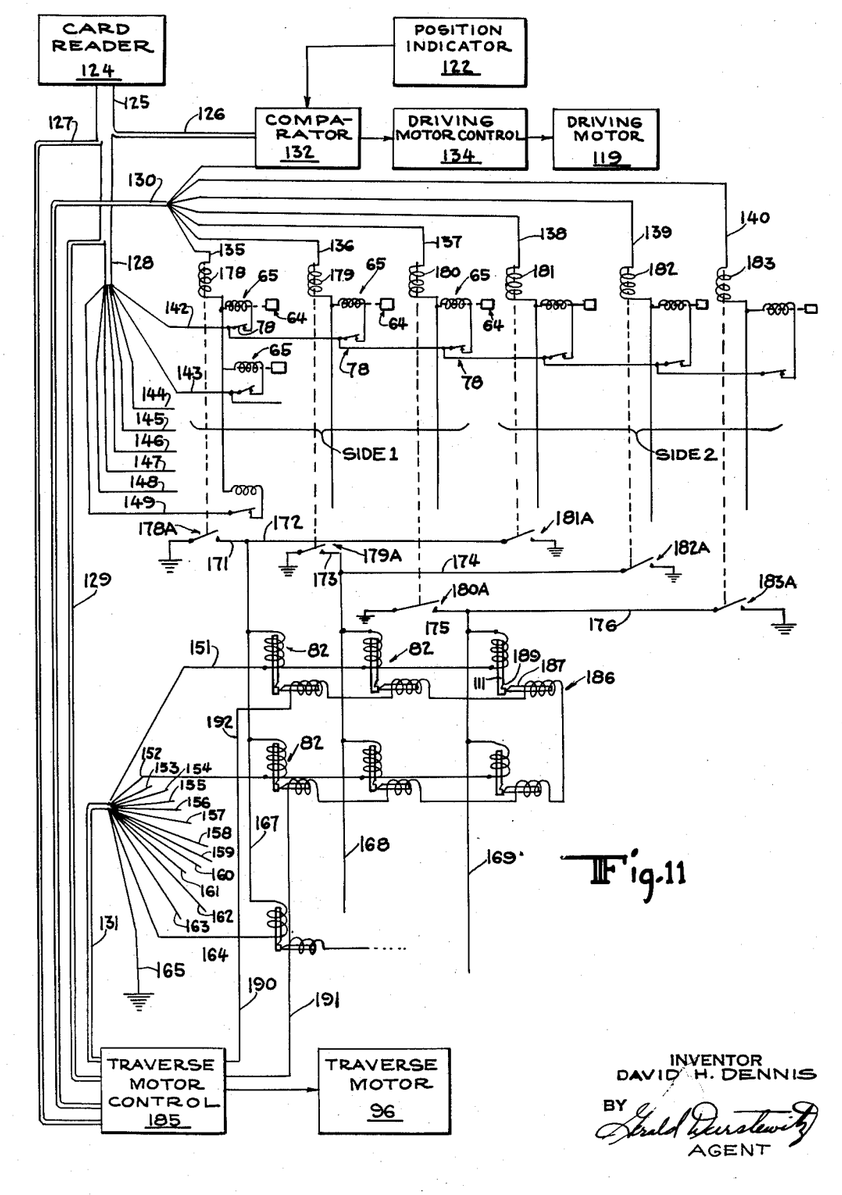
FIG. 11 is a diagram of the electrical circuits for controlling the operations of the picking machine.

The distance along the rails corresponding to the length of the storage units is divided into a plurality of picking machine positions, each position coinciding with three vertical columns of storage bins, in each of the storage units. A position marking device 121 is provided at each position, and a position indicating device 122 (FIGS. 2 and 11) mounted on the cabinet is acted on by the marking device 121 to give an electrical signal indicating the position at which the picking machine is located. When the indicating device 122 is aligned with one of the position marking devices 121, the three vertical columns of picking units on each side of the picking machine are aligned with three vertical columns of storage bins and each picking unit 36 in each column is in alignment with one of the storage bins 20 as shown in FIG. 2.

The Control System

The picking machine is under the control of a punched card reader 124 (FIG. 11) located at a remote point and connected to the picking machine by an electrical cable 125. The cable 125 after entering the picking machine divides into a plurality of branch cables 126, 127, 128 and 129. The branch cable 126 is connected to a comparator 132 which is connected to the position indicator 122 and also to the driving motor 119 through a driving motor control unit 134. The branch cable 127 is connected through a traverse motor control unit 185 to a cable 130 which comprises six wires 135 to 140, each of which is connected to one end of those solenoids 65 which control the picking units in one vertical column. The wires 135, 136 and 137 are connected to the solenoids 65 associated with the three columns of picking units on one side of the picking machine, and the wires 138, 139 and 140 are connected to the solenoids 65 associated with the three columns of picking units on the other side of the picking machine.

The control unit 185 is connected to and controls the operation of the traverse motor 96. The branch cable 128 includes eight wires 142 to 149 each of which are connected through the limit switches 78 to the opposite end of those solenoids 65 associated with picking units having the same vertical positions. The branch cable 129 is connected through the traverse motor control unit 185 to cable 131 which contains fourteen wires 151 to 164 connected to the solenoids 82, and a common return wire 165 connected to ground.

Each of the wires 151 to 164 is connected to one lead of the three solenoids 82 positioned over each of the conveyor belts 25. The other leads of each of the solenoids 82 are connected to one of three conductors 167, 168 and 169, each of the fourteen solenoids aligned with one of the article carrying plates 86 being connected to conductors 167 while those solenoids aligned with the other two plates 86 are connected respectively to conductors 168 and 169. The conductors 167 to 169 are each connected to two grounded leads 171 and 172, 173 and 174, 175 and 176, respectively. Six relays are provided for the control of the solenoids 82, each having a coil 178–183 connected between the solenoids 65 and the wires 135 to 140 respectively and each having a pair of normally open contacts 178A–183A connected in each of the grounded leads 171, 173, 175 172, 174 and 176 respectively.

An electromagnetic latch 186 having a spring loaded plunger 187 may be provided at each solenoid to engage a notch 189 in the plunger 111 of the solenoid. The leads of the latches 186 are connected in series between a pair of leads 190, 191 extending from the traverse motor control unit 185 which also is connected to the traverse motor.

Operation

Upon receipt of an order at the warehouse a punch card is made available for each pattern ordered. The information punched on the card includes the location at which the pattern ordered is stored and the conveyor belt on which the pattern is to be placed. The location of the pattern is defined by three pieces of information, namely: the picking machine position at which the pattern is located; the vertical column of bins, at this position, in which the pattern is located; and the vertical position of the bin which contains the pattern.

The conveyor belt on which the pattern is to be placed is assigned according to the customer order, all patterns listed on a single customer order being assigned to the same conveyor belt and each conveyor belt being assigned to only one customer order each time the picking machine moves through the length of the storage units. All patterns listed on any one order are picked during one trip of the picking machine through the length of the storage units.

Since there are fourteen conveyor belts 25, punch cards for all of the patterns listed on fourteen separate orders may be placed in the card reader at one time.

The punch cards are read consecutively by the card reader, and the picking machine, in response to the information on each card, moves to the designated position and picks the proper pattern before the next card is read. Before the cards are placed in the card reader, they are sorted and placed in consecutive order according to picking machine positions. This sorting eliminates unnecessary movement of the picking machine. Under certain conditions it may be advantageous that all cards for patterns at the same picking machine position be sorted according to the side of the picking machine at which the patterns are located to eliminate unnecessary movement of the sorting mechanism 40. This mode of operation is assumed for the purpose of illustration.

When the picking machine is in a standby condition awaiting directions from the card reader, the driving motor 119 and the traverse motor 96 are de-energized, the vacuum pump 76 is being driven by the motor 80, and the solenoids 65 and 82 are de-energized. Each of the four-way valves 64 is then in the condition shown in FIG. 4 and the picking unit pistons 44 are each held in the retracted position by the vacuum developed in the annular area between flanges 51 and 54.

As the card reader 124 reads the first of a group of cards for patterns located at the same picking machine position, it translates the information on the card relating to this position into an electrical signal which is transmitted through the cable 125 and the branch cable 126 to the comparator 132 where it is compared with a signal from the position indicator 122 corresponding to the present position of the picking machine. The output of the comparator actuates the driving motor control 134 causing the driving motor 119 to move the picking machine in the proper direction until the position indicator 122 indicates that the machine is at the position indicated on the card.

When the machine is properly positioned the three columns of picking units on each side of the machine coincide with three of columns of storage bins in each of the storage units. The card reader then responds to the information on the card relating to the vertical column of bins in which the pattern is located at this position, and energizes that wire 135, 136, 137, 138, 139 or 140 which is connected to one lead of those solenoids 65 controlling the picking units 36 coinciding with this column of bins. Simultaneously with this action, the card reader also responds to the information on the card relating to the vertical position of the bin in which the pattern is located and places ground on that wire 142, 143, 144, 146, 147, 148 or 149 which is connected to the other lead of those solenoids 65 which control the picking units 36 located at this level.

For the purpose of explanation, it is assumed that the card reader has energized wire 135 and grounded the wire 143. It may be seen therefore, that the single solenoid 65 to which each of these wires is connected will be energized operating the associated valve 64. The solenoid 65 when energized rotates the valve member 72 (FIG. 4) until the arcuate passageway 74 connects the parts 67 and 70 and the passageway 75 connects the ports 69 and 68. The annular space between the flanges 51 and 54 is thereby placed in communication with the atmosphere through the port 70 destroying the vacuum therein and allowing the spring 60 to move the piston 44 outwardly. As the piston moves outwardly, the vacuum pump 76 draws air through the opening 59 and the bore 56 into the conduit 62. When the cup shaped rubber head 57 contacts the surface of the leading pattern in the designated bin, the flow of air into the bore 56 is stopped by the pattern and the continued operation of the pump 76 creates a vacuum in the bore 56 and the portion of the cylinder 41 between the flange 51 and the wall 49 thereby decreasing the pressure acting on the rear face of the cylindrical body 52. The air pressure acting on the back surface of the pattern is now greater than the air pressure acting on the front surface and the unbalanced pressure pushes the pattern past the lips 22 and forces the piston 44 inwardly against the spring 60.

Figure 6:
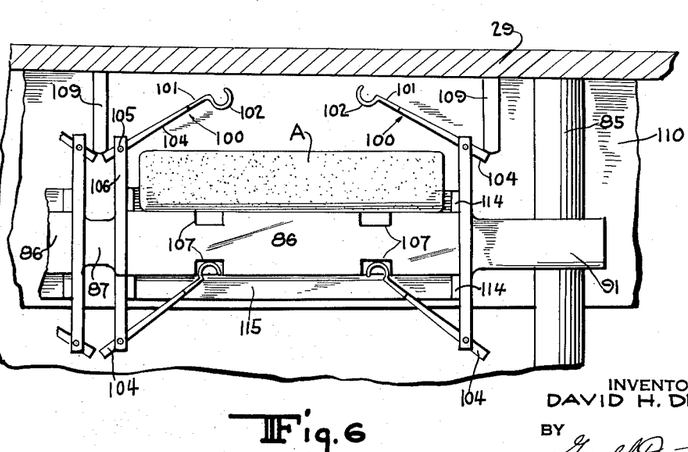
FIG. 6 is a greatly enlarged view of a portion of FIG. 3 illustrating the static condition of part of the sorting mechanism.

Since the area of the cylindrical body 52 is greater than the area of the flange 54, the unbalanced air pressure acting on the back of the pattern forces the piston inwardly past the standby position and the head 55 contacts the plunger 79 actuating the limit switch 78. The operation of the limit switch de-energizes the solenoid 65 returning the valve 64 to the standby condition in which the conduit 62 is in communication with the atmosphere through the port 70. The vacuum in the bore 56 is thereby destroyed and the pattern picked by the piston 44 is released, slides down the inclined wall 29, is deflected by the chute 32 through the opening 30, and falls to the shelf 110 where, as shown in FIG. 6, it stands on edge leaning against the carrying plate 86 which is in alignment with this column of picking units.

The current which flows through the wire 135 when this solenoid 65 is energized, also energizes the relay coil 178 causing the relay contacts 178A to close thereby placing ground on one lead of each of the fourteen solenoids 82 which are aligned with the plate 86 which will carry the article picked. At the same time, the card reader responds to the information on the card relating to the conveyor belt on which the pattern is to be deposited and energizes that wire (151-164) which is connected to the other lead of the three solenoids 82 positioned over the designated conveyor belt 25. The single solenoid 82 which is aligned with the proper plate 86 and is positioned over the proper belt 25 is energized thereby moving its plunger 111 downwardly. When the plunger 111 is fully extended, the plunger 187 of the latch 186 moves outwardly under its spring loading and engages the notch 189 locking the plunger 111 in the extended position.

The card reader then goes on to the next card and consecutively reads subsequent cards corresponding to articles located on the same side of the picking machine at that position, directing the picking machine to perform the same functions as described heretofore. When the card reader reads the first card corresponding to a pattern located on the other side of the machine at this position, a wire in the cable 127 corresponding to one of the wires 138, 139 or 140 is energized. The traverse control unit, however, prevents any of the wires 138 to 140 from being energized until the traversing assembly 81 is moved to the opposite side of the machine. The control unit 185 responds to the energizing of the wire in the cable 127 and causes the traverse motor 96 to rotate the threaded rod 84 in the proper direction to move the traversing assembly 81 toward the opposite side of the machine.

As the traversing assembly 81 moves away from the wall 29 and the protrusions 109 (FIG. 6) the spring clips 100 are rotated under the action of the springs 108 to grip the pattern (or patterns) and hold the same against the surface of the plate 86. As the assembly 81 moves across the machine the clips 100 pass freely under those solenoids which were not energized during the picking operations. However, as shown in FIGS. 7, 8 and 9, when the plate 86 passes beneath the extended plunger of a solenoid which was energized, the clips 100 on the empty side of the plate 86 clear the bar 112 because they are positioned in the recesses 107, while the clips 100 on the loaded side of the plate (which are held in an outward position by the patterns they are gripping), are contacted by the bar and are rotated away from the plate thereby releasing the pattern and allowing it to fall on the conveyor belt 25.

As shown in FIG. 10, when a number of patterns are carried simultaneously by a plate 86, the pattern against the surface of the plate is positioned near the edge of the conveyor belt 25 at the point of release. The inclined surface 115 (FIG. 8) is provided to deflect this pattern toward the center of the intended conveyor belt and prevents placement of the pattern on an adjacent belt.

When the traversing assembly reaches the other side of the machine all of the patterns picked have been placed on the proper conveyor belts and the motor control unit 185 stops the motor 96 and energizes the latches 186 to allow the spring loaded plunger 111 of the solenoids 82 to retract. The machine then picks those patterns ordered which are located on this side of the machine at this position. When all of these patterns have been picked the traversing assembly 81 is again moved across the machine and places the patterns on the proper conveyor belts. The machine then moves to the picking station called for by the next card where the operation is repeated.

If the card reader directs the picking machine to pick a pattern located in a particular vertical column of bins and to place it on a particular conveyor belt, and then, while the machine is in the same position, reads another card which calls for another pattern to be picked from the same column of bins and deposited on a different conveyor belt, the traverse motor control unit will temporarily prevent energizing of any of the wires in cable 130 or cable 131 and will cause the motor 96 to move the traversing assembly 81 across the machine and back again to clear the sorting mechanism before the second article is picked thereby preventing patterns from being deposited on the wrong conveyor belt.

In this manner, the picking machine can start at one end of the storage units and while traversing the length of the units can pick patterns listed on fourteen orders, all patterns listed on each of the orders being placed on a single conveyor belt which transports them to a collecting station. When the picking machine reaches the end of the storage units, another set of cards can be placed in the card reader and the machine will fill fourteen additional order on the return trip.

It may be seen that with this arrangement the patterns may be located in random order with respect to their identifying numbers since the information identifying the bin location is carried by each card. The periodic movement of stock is thereby eliminated.

*Conclusion*

While the invention has been described in connection with dress patterns, it may be used in its entirety in connection with any articles having the same general shape, and various features of the invention may find application in connection with articles having other shapes or sizes.

From the foregoing description, it will be seen that the present invention provides a warehousing system which will rapidly and selectively remove a number of randomly placed diverse articles from a storage unit, and will sort the articles removed to fill a plurality of orders simultaneously. The system includes a movable stock picking and handling machine which picks and sorts the articles and discharges them onto a conveyor for delivery to a collection station.

As various changes may be made in the form, construction and arrangement of the parts herein, without departing from the spirit and scope of the invention and without sacrificing any of its advantages, it is to be under-

I claim:

1. In an article handling system, the combination of article storage means including a plurality of storage members arranged in a horizontal row, each of said storage means containing a plurality of identical articles different from articles in other of said storage means; a frame movable along said row of storage means; stock picking means on said frame including a plurality of horizontally spaced reciprocating picking members; article receiving means on said frame; gravity feed delivery means on said frame for delivering picked articles from said picking means to said receiving means; conveyor means beneath said frame parallel to said row of storage members, said article receiving means being horizontally positioned between said storage members and said conveyor means; sorting means on said frame for moving articles from said receiving means to selected transverse positions on said conveyor means including means for transporting articles from said receiving means transversely across said conveyor means and means for transferring the articles from said transporting means to said conveyor means at said selected transverse positions, said transporting means including a plurality of transporting portions spaced longitudinally along said conveyor means each constructed and arranged to transport the articles picked by one of said picking members and said transfer means including a transfer member at each of said selected transverse conveyor positions for each of said transporting portions; and means for simultaneously energizing a selected picking member and a selected one of said transfer members at said transporting portion associated with said picking member.

2. In an article handling system, the combination of article storage means including a plurality of storage members arranged in a row, a frame movable along said row, stock picking means on said frame for removing articles from said storage members, article receiving means on said frame, gravity feed delivery means on said frame for delivering picked articles from said picking means to said receiving means, conveyor means beneath said frame parallel to said row of storage members and positioned to one side of said receiving means, and sorting means for moving articles from said receiving means to selected transverse positions on said conveyor means including means moveable from said receiving means transversely across said conveyor means and means for transferring the articles from said transporting means to said conveyor means at selected transverse positions, said frame including a wall spaced from said storage means extending downwardly from said picking means and outwardly from said conveyor means and having a plurality of openings therein, said delivery means includes chute means formed on the surface of said wall facing said storage means, said picking means including picking members constructed and arranged to extend through said openings for removing articles from said storage means and depositing the articles on said chute means.

3. In an article handling system, the combination of article storage means including a plurality of storage members arranged in a pair of spaced rows, a frame movable between said rows, stock picking means on each side of said frame for removing articles from said storage members of both of said rows, article receiving means on each side of said frame, gravity feed delivery means on each side of said frame for delivering picked articles from said picking means to said receiving means, conveyor means beneath said frame parallel to said row of storage members, said article receiving means being horizontally positioned between said storage members and said conveyor means, and sorting means for moving articles from each of said receiving means to selected transverse positions on said conveyor means including means moveable transversely across said conveyor means between said receiving means for transporting articles from each of said receiving means transversely across said conveyor means and means for transferring the articles from said transporting means to said conveyor means at selected transverse positions.

4. Apparatus according to claim 3, wherein said article transporting means includes an article carrying member moveable transversely across said conveyor means and provided with first article holding means for holding articles transported from one of said receiving means and second article holding means for holding articles transported from the other of said receiving means, said article holding means having a first position when holding an article and having a second position when not holding an article, and said transferring means including an article releasing member at each of said selected transverse positions adapted to be moved into a position to engage and operate said article holding means in said first position when said article carrying member moves across said conveyor means whereby articles carried by said carrying member are released onto said conveyor means.

5. Apparatus according to claim 1, wherein said article storage means includes a plurality of storage members arranged in a horizontal row of vertically extending columns, and said picking members are arranged in vertically spaced horizontal rows.

References Cited in the file of this patent

UNITED STATES PATENTS

| | | |
|---|---|---|
| 1,479,321 | Runsvold et al. | Jan. 1, 1924 |
| 1,522,600 | Strickland | Jan. 13, 1925 |
| 2,011,793 | Bond | Aug. 20, 1935 |
| 2,198,976 | Rober | Apr. 30, 1940 |
| 2,634,869 | Hicks | Apr. 14, 1953 |
| 2,652,931 | Hughes | Sept. 22, 1953 |
| 2,665,775 | Smith | Jan. 12, 1954 |
| 2,675,134 | Becker | Apr. 13, 1954 |
| 2,915,201 | Calehuff et al. | Dec. 1, 1959 |

FOREIGN PATENTS

| | | |
|---|---|---|
| 717,018 | Great Britain | Oct. 20, 1954 |